(12) United States Patent
Schemmann et al.

(10) Patent No.: US 8,503,056 B2
(45) Date of Patent: Aug. 6, 2013

(54) BIAS POINT CONTROL CIRCUIT FOR EXTERNALLY MODULATED TRANSMITTER

(75) Inventors: Marcel F. Schemmann, Maria Hoop (NL); Venkatesh G. Mutalik, Middleton, CT (US)

(73) Assignee: ARRIS Group, Inc., Suwanee, GA (US)

( * ) Notice: Subject to any disclaimer, the term of this patent is extended or adjusted under 35 U.S.C. 154(b) by 271 days.

(21) Appl. No.: 13/097,987

(22) Filed: Apr. 29, 2011

(65) Prior Publication Data

US 2011/0267670 A1 Nov. 3, 2011

Related U.S. Application Data

(60) Provisional application No. 61/329,311, filed on Apr. 29, 2010.

(51) Int. Cl.
*G02B 26/00* (2006.01)
*H01S 3/00* (2006.01)
*G02B 6/12* (2006.01)
*G02B 6/26* (2006.01)

(52) U.S. Cl.
USPC ............... 359/239; 359/337; 385/14; 385/16; 385/22

(58) Field of Classification Search
USPC . 359/237–240, 341.1, 344, 337–339; 385/14, 385/16, 22
See application file for complete search history.

(56) References Cited

U.S. PATENT DOCUMENTS 6,580,544 B1 * 6/2003 Lin et al. ...................... 359/239

* cited by examiner

*Primary Examiner* — Jack Dinh
(74) *Attorney, Agent, or Firm* — Troy A. Van Aacken; Robert J. Starr

(57) ABSTRACT

Methods and apparatuses for controlling a bias point voltage for an external optical modulator are provided. A control loop is used to adjust a bias signal applied to an external modulator by determining unwanted signals at a predetermined frequency received by an optical receiver of the control loop and accounting for these unwanted signals when determining the bias point voltage.

14 Claims, 5 Drawing Sheets

BIAS POINT CONTROL CIRCUIT FOR EXTERNALLY MODULATED TRANSMITTER

CROSS REFERENCE TO RELATED APPLICATION

This application claims the benefit of U.S. Provisional Application Ser. No. 61/329,311, entitled "Composite Second Order Control Circuit for Externally Modulated Transmitter," which was filed on Apr. 29, 2010, and is incorporated herein by reference in its entirety.

TECHNICAL FIELD

This disclosure relates to bias point control methods and apparatuses for optical modulators.

BACKGROUND

In a communication system, information is transmitted via message signals through a physical channel from a source to a destination. For example, a Data-Over-Cable Service Interface Specification (DOCSIS) system can be used to deliver high-definition digital entertainment and telecommunications such as video, voice, and high-speed Internet over a cable network between a headend and a cable modem located at a subscriber premise. The cable television network can take the form of an all-coax, all-fiber, or hybrid fiber/coax (HFC) network.

Message signals conveying information to be transmitted can undergo modulation prior to transmission. Modulation generally is the process of superimposing a message signal on a carrier signal that is suitable for transmission over a physical channel. More specifically, during modulation, a message signal is used to control the parameters (e.g., amplitude, frequency, and/or phase) of a carrier signal so as to superimpose the message signal on the carrier signal. To recover the message signal at the receiver, the received modulated message signal is demodulated.

In an HFC network, for example, an optical transmitter in the headend/hub converts the electrical signals representing traffic (e.g., data, video, and voice signals) to downstream optically modulated signals. Within the optical transmitter, an electro-optic external modulator can be used to modulate an optical carrier with the information to be transmitted. The headend/hub transmits optical signals downstream to a fiber node via a downstream optical fiber. The fiber node includes an optical receiver that converts the received optical signals to electrical signals; the electrical signals then are transmitted to CMs that are served by the fiber node. The fiber node also includes an upstream optical transmitter that combines the electrical signals received from the CMs that are served by the fiber node and converts the resulting electrical signals to upstream optically modulated signals. The fiber node then transmits the optical signals upstream to the headend/hub via an upstream optical fiber. In the headend/hub, a receiver can operate to convert the upstream optical signals to electrical signals.

The external modulators that are used to modulate the optical carrier with an information signal can exhibit non-linearity and therefore produce second order harmonics. To minimize these non-linear effects, a bias signal can be applied to an external modulator to establish an operating or bias point that can help the modulator to maintain linear operation. However, the bias point of an external modulator can vary due to, for example, temperature variations thereby resulting in performance degradation. Thus, a control loop can be used to monitor the output of the external modulator and adjust the bias signal applied to it.

DETAILED DESCRIPTION

Various implementations of this disclosure adjust a bias signal applied to an external modulator by determining unwanted signals at a predetermined frequency and accounting for these unwanted signals when determining the bias point voltage.

Figure 1:
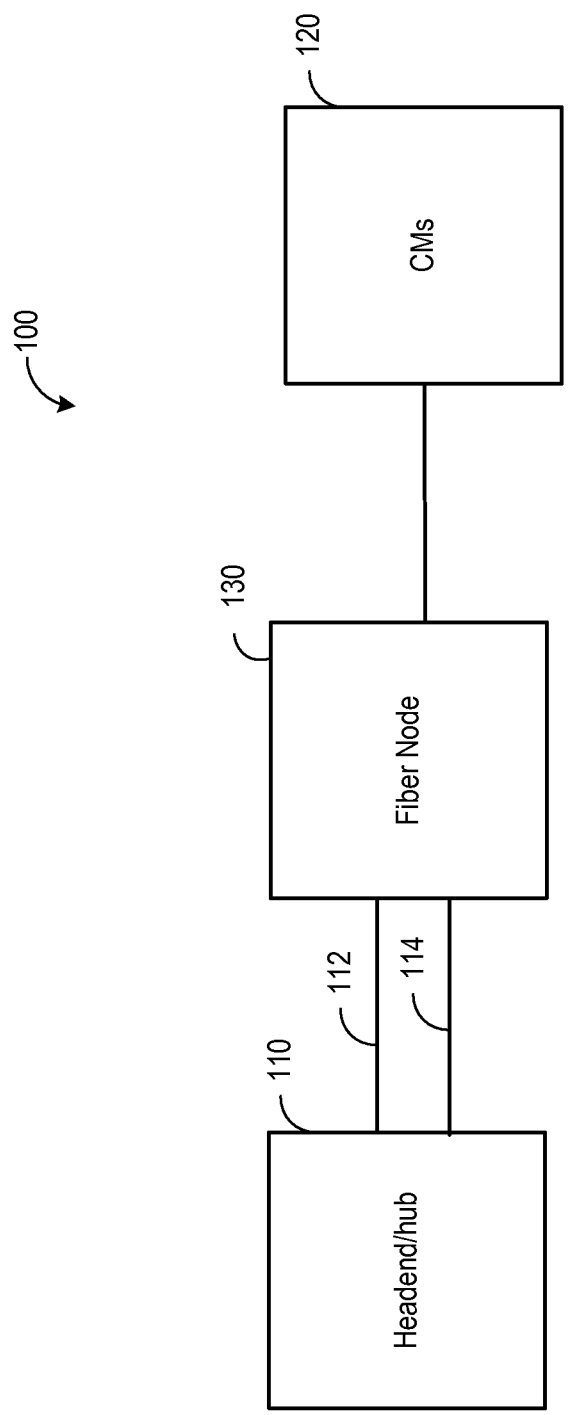
FIG. 1 is a block diagram illustrating an example DOCSIS-based system.

FIG. 1 illustrates an example DOCSIS-based system 100. The DOCSIS-based system 100 uses two fibers 112, 114 for bi-directional communication between a headend/hub 110 and CMs 120. An optical transmitter in the headend/hub converts the electrical signals representing traffic (e.g., data, video, and voice signals) to downstream optically modulated signals. Within the optical transmitter, an electro-optic external modulator can be used to modulate an optical carrier with the information to be transmitted. The headend/hub 110 transmits the optical signals downstream to a fiber node 130 via a fiber 112. The fiber node 130 includes an optical receiver that converts the received optical signals to electrical signals that are transmitted to the CMs 120 that are served by the fiber node 130.

The fiber node 130 also includes an upstream optical transmitter that combines the electrical signals received from the CMs 120 and converts the resulting electrical signals to optical signals and transmits the optical signals upstream to the headend/hub 110 via the fiber 114.

As discussed above, external modulators can be used to modulate an optical carrier with an electrical signal; however, these modulators can produce second order harmonics. These second order harmonics may be reduced by applying a bias signal to the external modulator and then using a control loop to adjust the bias signal if needed.

Figure 2:
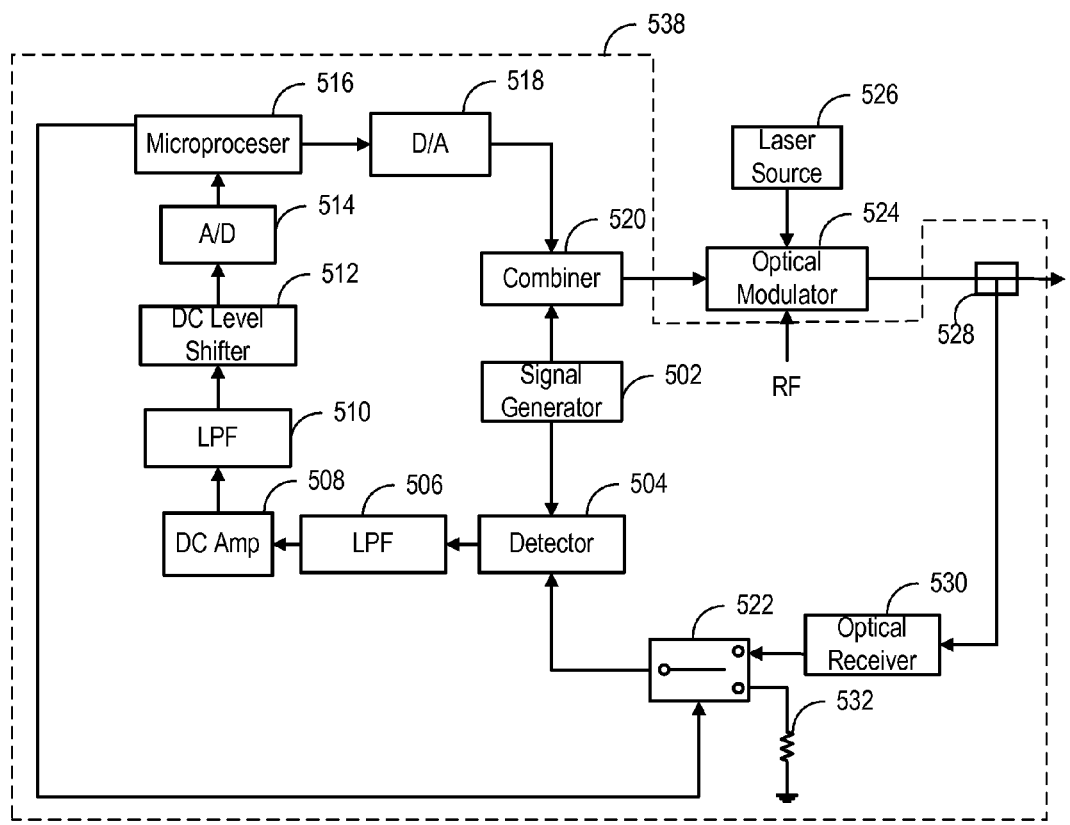
FIG. 2 is a block diagram illustrating a prior art bias voltage controller circuit.

U.S. Pat. No. 6,580,544 discloses a bias voltage controller circuit 538 as shown in FIG. 2. The bias voltage controller circuit 538 drives a modulator 524 with a signal having a frequency f1, monitors the output of the modulator 524 for signal components at 2f1, and adjusts the bias voltage applied to the modulator 524.

More specifically, the bias voltage controller circuit 538 utilizes a microprocessor 516 to compute an offset voltage to adjust the bias voltage applied to optical modulator 524. D/A converter 518 converts the offset voltage computed by microprocessor 516 to a DC voltage signal. Combiner 520 receives the DC offset voltage from D/A converter 518 and a tone signal with frequency f1 from signal generator 502 and produces a bias voltage control signal that is applied to modulator 524.

The modulator 524 receives the bias voltage control signal from combiner 520 along with an electrical transmission signal RF and light from laser 526. When the modulator 524 receives the bias voltage control signal from combiner 520, the modulator 524 can produce a tone signal with frequency 2f1 ("first tone signal"), which coupler 528 provides to optical receiver 530.

Based on a control signal from microprocessor 516, switch 522 outputs to a detector 504 either a reference voltage via resister 532 or the output from optical receiver 530.

The detector 504 also receives a tone signal with a frequency of 2f1 from the signal generator 502 ("second tone signal"). According to the '544 patent, the detector 504 can be a synchronous detector such as a mixer. Thus, the detector 504 can detect signals at frequency 2f1 in the output of the optical receiver 530. When the switch 522 outputs to the detector 504 the output from the optical receiver 530, the detector 504 can output the first tone signal, the second tone signal, and a DC error voltage signal to a low pass filter 506. The DC error voltage signal represents the correlation of the first tone signal and the second tone signal.

In some implementations, it can be assumed that the signal generator 502 output at frequency 2f1 equals $A \sin(2\pi f1 t)$ and the receiver output equals $C \sin(2\pi f1 t) + D \cos(2\pi f1 t)$. "A" can be considered a constant and C and D can depend on the modulator 524 output and unwanted crosstalk at frequency 2f1. The DC component of the correlation of the signal generator 502 output at frequency 2f1 and the receiver 530 output will be proportional to A*C. Thus, the DC component of the correlation of the signal generator 502 output at frequency 2f1 and the receiver 530 output can be used to determine if the receiver 530 output contains a signal component at frequency 2f1.

The low pass filter 506 filters out the first tone signal and harmonics thereof and the second tone signal and harmonics thereof and outputs the DC error voltage signal to an amplifier 508. Since the DC error voltage signal can be small, it is amplified by the amplifier 508. The resulting DC error voltage signal is filtered by low pass filter 510 to remove any noise. The resulting DC error voltage signal is then processed by DC level shifter 512 to shift the voltage level of the signal within the input range of A/D converter 514. The A/D converter 514 converts the resulting DC error voltage signal to a digital signal for processing by the microprocessor 516.

According to the '544 patent, the microprocessor 516 then computes the offset voltage by subtracting from the digital DC error voltage signal a stored extra offset voltage and a zero shifting voltage. Generally, the zero shifting voltage can be the voltage that shifts the output of the amplifier 508 to the center of the A/D converter range. The extra offset voltage generally represents the voltage output from the amplifier 508 and detector 504 even when no signal is present at frequency 2f1. To determine the extra offset voltage and a zero shifting voltage, the microprocessor 516 issues a control signal to switch 222 to output to the detector 504 the reference voltage via resister 532. The resulting digital signal from A/D converter 514 represents the extra offset voltage and a zero shifting voltage that is stored in microprocessor 516.

The prior art optical receiver 530 of FIG. 2 needs a high gain to provide a sufficient signal to detector 504. Thus, the prior art receiver 530 is sensitive to noise and electromagnetic interference in the frequency band close to frequency 2f1. To prevent the detrimental effects of noise and signals coupled into the receiver 530, the '544 patent requires careful design and expensive shielding of the components of the control circuit 538. Also, if the transmission signal RF has a frequency component close to frequency 2f1, then the microprocessor 516 may treat the transmission signal RF as an unwanted signal produced by the modulator 524 at frequency 2f1. This can result in the microprocessor 516 incorrectly setting the bias point of the modulator 524.

Figure 3:
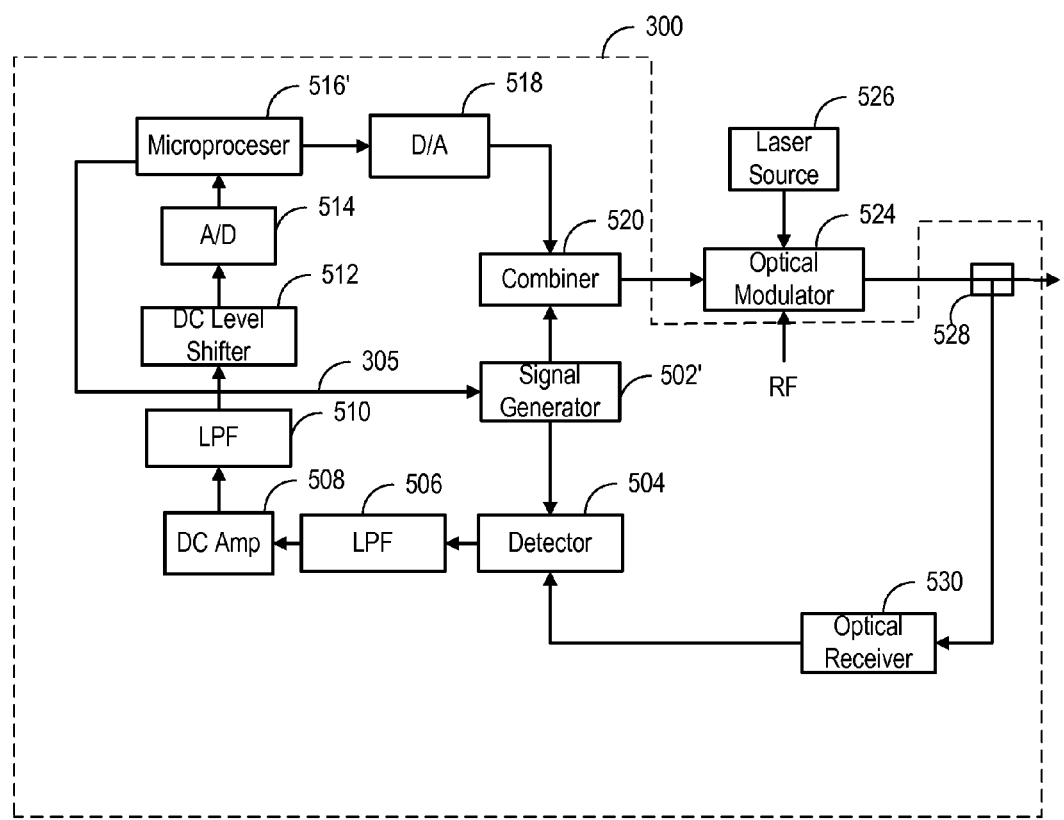
FIG. 3 is a block diagram illustrating an implementation of an improved bias voltage controller circuit.

The above-mentioned problems can be overcome by modifying the bias voltage controller circuit 538 as shown in FIG. 3.

FIG. 3 illustrates an example implementation of an improved bias voltage controller 300. In the controller 300, a control signal 305 is provided to signal generator 502' from microprocessor 516'. This control signal can be used to turn the signal generator 502' output at frequency f1 on or off. For example, the control signal 305 controls whether signal generator 502' outputs a tone signal with frequency f1. As a result, the control signal 305 effectively controls whether the modulator 524 produces a tone signal with frequency 2f1 based on the tone signal with frequency f1 produced by signal generator 502'. In some implementations, the control signal 305 can be used to control whether the signal generator 502' produces a low or high amplitude tone signal with frequency f1 thereby resulting in the modulator 524 producing either a low or high amplitude tone signal with frequency 2f1.

When the signal generator 502' output at frequency f1 is on, it produces a tone signal with frequency f1. Thus, when the modulator 524 receives the bias voltage control signal from combiner 520, the modulator 524 can produce a tone signal with frequency 2f1 ("first tone signal"), which coupler 528 provides to optical receiver 530. In some implementations, the optical receiver 530 can be connected to the detector 504 without the use of a switch.

The detector 504 also receives a tone signal with a frequency of 2f1 from signal generator 502' ("second tone signal"). Detector 504 can output the first tone signal and harmonics thereof, the second tone signal and harmonics thereof, and the DC error voltage signal to low pas filter 506. Low pass filter 506 filters out the first tone signal and the second tone signal and outputs the DC error voltage signal, which is amplified by amplifier 508, filtered by low pass filter 510, and processed by DC level shifter 512. The A/D converter 514 converts the resulting DC error voltage signal to a digital signal for processing by the microprocessor 516.

Microprocessor 516 then computes the bias point voltage by subtracting a stored adjustment value from the digital DC error voltage signal. To determine the adjustment value, microprocessor 516 issues a control signal to signal generator 502' to turn off the output at frequency f1. The digital signal from A/D converter 514 when the signal generator 502' output at frequency f1 is off represents the extra offset voltage, a zero shifting voltage, and also the DC error voltage signal that is caused by unwanted signals at frequency close to 2f1 that are picked up and amplified by the optical receiver 530. This digital signal from the A/D converter 514 when the signal generator 502' output at frequency f1 is turned off is stored in microprocessor 516 as the adjustment value. Thus, while the optical receiver 530 can still have a high gain and can be sensitive to picking up unwanted crosstalk and signals close to frequency 2f1, these unwanted signals appear in the digital signal from A/D converter 514 when the signal generator 502' output at frequency f1 is off and become a part of the adjustment value stored in microprocessor 516 as discussed above.

The microprocessor 516 determines the bias point voltage by subtracting the adjustment value, which includes these unwanted signals, from the digital DC error voltage. Thus, the calculated bias point is not as sensitive to unwanted signals close to frequency 2f1 that can be present in the optical receiver 530 output. The cost of shielding the optical receiver 530 can be thereby reduced or even eliminated.

Figure 5:
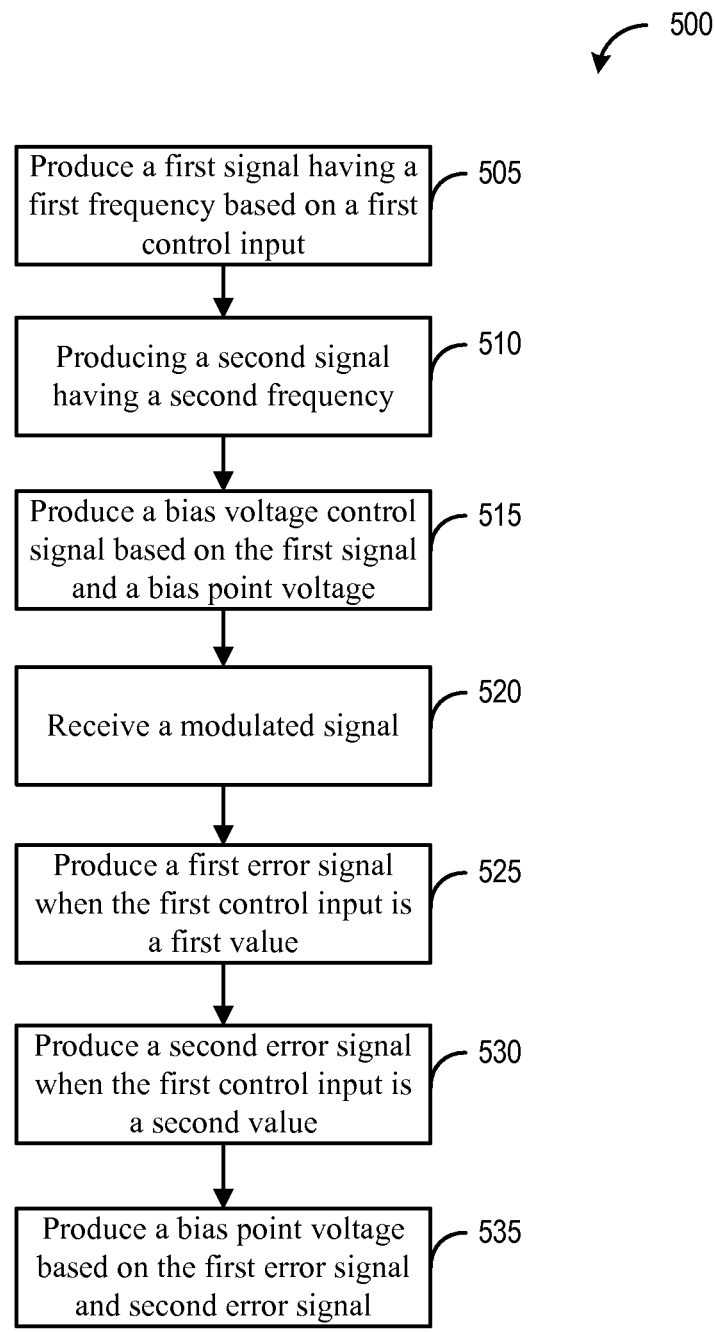
FIG. 5 is a flowchart illustrating an example process for controlling a bias voltage for an external optical modulator.

FIG. 5 illustrates an example process for controlling a bias point voltage for an external optical modulator. At stage 505, a first signal having a first frequency (e.g., frequency f1) based on a first control input is produced. The first signal having the first frequency can be produced, for example, by signal generator 502' of FIG. 3. In some implementations, the first signal and second signal have a zero magnitude when the first control input is a first value and have a non-zero magnitude when the first control input is a second value. In some implementations, the first signal and second signal have a low magnitude when the first control input is a first value and have a higher magnitude when the first control input is a second value At stage 510, a second signal having a second frequency (e.g., frequency 2f1) is produced. The second signal having the second frequency can be produced, for example, by signal generator 502' of FIG. 3.

At stage 515, a bias voltage control signal based on the first signal and a bias point voltage is produced. The bias voltage control signal can be produced, for example, by microprocessor 516' of FIG. 3.

At stage 520, a modulated signal from an external optical modulator (e.g., modulator 524) is received. The modulated signal from an external optical modulator can be received, for example, by optical receiver 530 of FIG. 3. The external optical modulator operates at a bias point based on the bias voltage control signal produced at stage 515.

At stage 525, a first error signal based on the modulated signal and the second signal when the first control input is a first value is produced. The first error signal can be produced, for example by, detector 505.

At stage 530, a second error signal based on the modulated signal and the second signal when the first control input is a second value is produced. The second error signal can be produced, for example by, detector 505.

At stage 535, the bias point voltage based on the first error signal and second error signal is produced. The bias point voltage can be produced, for example, by microprocessor 516'. In some implementations, the bias point voltage is based on a difference between the first error signal and the second error signal.

The bias voltage controller 300 of FIG. 3 can be insensitive to noise and spurs that are continually present in the optical receiver 530 output. However transient spurs may be mistaken for a real signal if they only occur in a limited period of time at least partly coinciding with one of the states (e.g., on or off) of the signal generator 502' output at frequency f1. The control loop may respond instantly to such a transient resulting in a temporary degradation of control loop performance. If the transient is strong, then one or a few short transients can seriously affect the performance of the control loop. Recovery from such an output can take a long time when the signal levels return to normal low levels.

Preventing such a response to transients can be accomplished either by slowing down the control loop by averaging a large number of input values or by differentiating between normal and abnormal signal levels. The first approach can be effective but can result in a slow system response such that the control circuit 300 cannot track external influences such as temperature changes.

With the second approach, the control circuit 300 (e.g., the microprocessor 516) can determine whether an output of the A/D converter 514 is within a certain range. In the absence of transients, the difference between the output of the A/D converter 514 when signal generator 502' output at frequency f1 is on and off can be within a certain range. The fastest change due to normal external influences such as temperature can be identified. Thus, whenever the difference between the output of the A/D converter 514 when signal generator 502' output at frequency f1 is on and off is outside a certain range, the microprocessor 516 can disregard a number of such outputs of the A/D converter 514. In some implementations, whenever the difference between the output of the A/D converter 514 when signal generator 502' output at frequency f1 is on and off is outside a certain range, the microprocessor 516 sets the bias point voltage to an expected level.

Thus, the bias voltage controller 300 of FIG. 3 can be insensitive not only to noise and spurs that are continually present in the optical receiver 530 output but also to short transient spurs.

The rate at which signal generator 502' output at frequency f1 is turned on and off can be chosen to prevent generating frequency components in the frequency band of the transmission signal RF. For example, the frequency band of the transmission signal RF can be 50-1000 MHz. The frequency f1 can be chosen to have a separation $\Delta f$ to the nearest frequency in the frequency band of the transmission signal RF so that the bias voltage control signal does not interfere significantly with the frequency band of the transmission signal RF. Thus, for $\Delta f=35$ MHz, for example, the frequency f1 can equal 15 MHz. Turning the signal generator 502' output at frequency f1 on and off creates spectral components around frequency f1. Thus, to prevent generating frequency components in the frequency band of the transmission signal RF, the rate at which the signal generator 502' is turned on and off should be less than (and in some implementations, significantly less than) $\Delta f$.

In some implementations, instead of turning the output at frequency f1 of the signal generator 502' on and off, the output signal level of the signal generator 502' output at frequency f1 is changed gradually from high to low where the time for this transition is at least $$\frac{1}{2\pi\Delta f}.$$

In some implementations, the transition time can be greater than or less than $$\frac{1}{2\pi\Delta f}.$$

In some implementations, the output level of the signal generator 502' output at frequency f1 is varied between different levels or modulated with another appropriately chosen (typically low) frequency.

Figure 4:
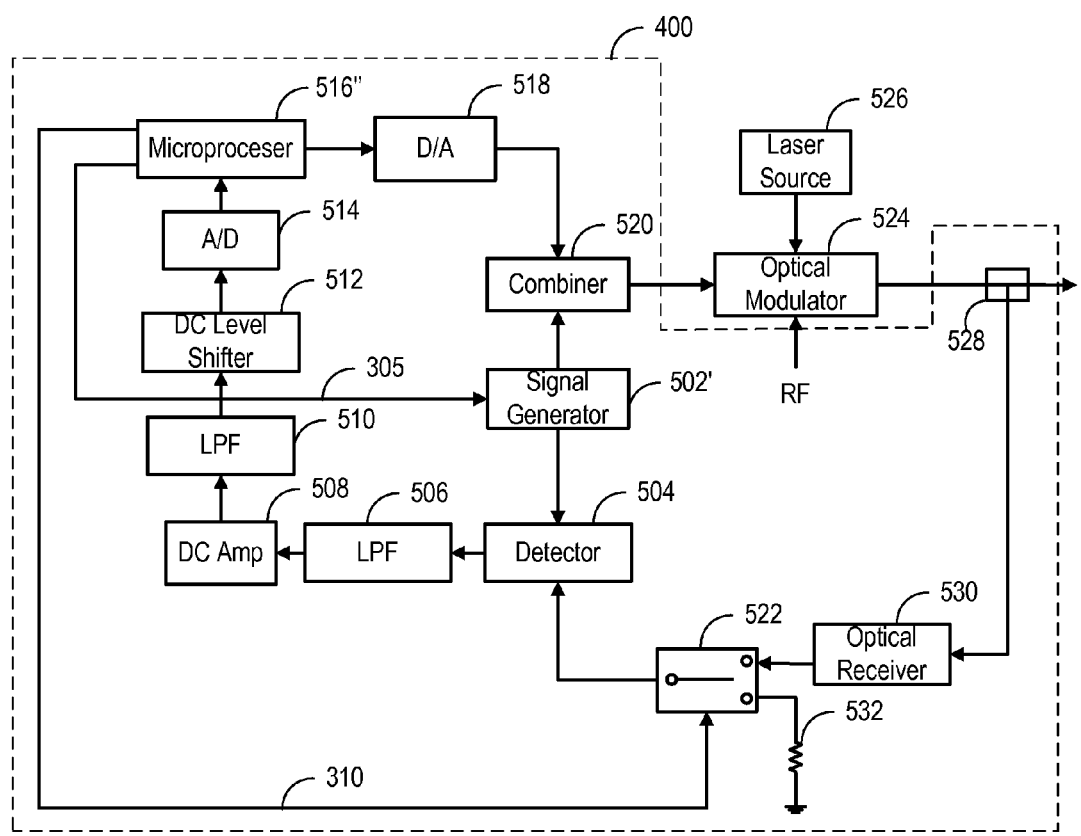
FIG. 4 is a block diagram illustrating another implementations of an improved bias voltage controller circuit.

FIG. 4 illustrates another implementation of an improved bias voltage controller circuit 400. The controller 400 of FIG. 4 using a first control signal 305 to turn the signal generator 502' output at frequency f1 on and off and a second control signal 310 to control switch 522. The use of two control signals permits the performance of the optical receiver 530 to be monitored. With the bias voltage controller 400 of FIG. 4, when the microprocessor 516" issues a control signal to switch 222 to select the reference voltage via resistor 532 and issues a control signal to signal generator 502' to turn off the output at frequency f1, the input to A/D converter 514 represents the offset voltages of all system components between switch 522 and A/D converter 514. However, when microprocessor 516" issues a control signal to switch 222 to select the output of optical receiver 530 and issues a control signal to signal generator 502' to turn off the output at frequency f1, then the input to A/D converter 514 represents the combination of unwanted receiver 530 output at frequency 2f1 and the aforementioned offset voltages. The difference between these inputs to the A/D converter 514 represents the receiver 530 performance. A large difference can suggest poor receiver SNR or large spurious signals being picked up. Thus, the performance of receiver 530 can be monitored.

When microprocessor 516" issues a control signal to switch 222 to select the output of optical receiver 530 and issues a control signal to signal generator 502' to turn the output at frequency f1 on and off, then the difference between A/D convertor 514 inputs can be used to perform the normal control function discussed above with respect to FIG. 3.

Implementations of the device of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

The processes and logic flows described in this specification can be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The invention claimed is:

1. A bias voltage controller for an external optical modulator comprising:
a signal generator configured to produce a first signal having a first frequency based on a first control input and a second signal having a second frequency;
a combiner configured to produce a bias voltage control signal based on the first signal and a bias point voltage;
an external optical modulator configured to operate at a bias point based on the bias voltage control signal and produce a modulated signal;
a detector configured to produce a first error signal based on the modulated signal and the second signal when the first control input is a first value and produce a second error signal based on the modulated signal and the second signal when the first control input is a second value; and
a processor configured to produce the bias point voltage based on the first error signal and second error signal.

2. The bias voltage controller of claim 1 wherein:
the first signal has a zero magnitude when the first control input is a first value and has a non-zero magnitude when the first control input is a second value; and
the bias point voltage is based on a difference between the first error signal and the second error signal.

3. The bias voltage controller of claim 2 wherein the processor is configured to set the bias point voltage to a predetermined value if the difference between the first error signal and the second error signal exceeds a threshold value.

4. The bias voltage controller of claim 2 wherein the processor is configured to maintain a previously computed bias point voltage if the difference between the first error signal and the second error signal exceeds a threshold value.

5. The bias voltage controller of claim 1 wherein the second frequency is twice the first frequency.

6. A bias voltage controller for an external optical modulator comprising:
a signal generator configured to produce a first signal having a first frequency based on a first control input and a second signal having a second frequency;
a combiner configured to produce a bias voltage control signal based on the first signal and a bias point voltage;
an external optical modulator configured to operate at a bias point based on the bias voltage control signal and configured to modulate an optical carrier with a third signal to produce a modulated signal;
an optical receiver to receive the modulated signal;

a switch configured to output the modulated signal from the optical receiver or a reference voltage when a second control input is a third value or fourth value respectively;

a detector configured to receive the switch output and the second signal wherein and produce a first, second, third, and fourth error signal based on the switch output and the second signal and a first, second, third, and fourth predetermined setting of the first and second control input, respectively;

a processor configured to produce the bias point voltage based on the first error signal and second error signal; and a optical receiver monitor configured to compute the difference between the third error signal and the fourth error signal to determine whether the difference exceeds a threshold value.

7. The bias voltage controller of claim 6 wherein:

the first signal has a zero magnitude when the first control input is a first value and has a non-zero magnitude when the first control input is a second value.

8. The bias voltage controller of claim of claim 7 wherein the detector is configured to produce a first error signal based on the switch output when the second control input is a third value and the first control input is a first value and the second signal and configured to produce a second error signal based on the switch output when the second control input is a third value and the first control input is a second value and the second signal and configured to produce a third error signal based on the switch output when the second control input is a fourth value and the first control input is a first value and the second signal and configured to produce a fourth error signal based on the switch output when the second control input is a third value and the first control input is a first value and the second signal.

9. The bias voltage controller of claim 6 wherein the second frequency is twice the first frequency.

10. A method for controlling a bias point voltage for an external optical modulator, the method comprising:

producing a first signal having a first frequency based on a first control input;

producing a second signal having a second frequency;

producing a bias voltage control signal based on the first signal and a bias point voltage;

receiving a modulated signal from an external optical modulator wherein the external optical modulator operates at a bias point based on the bias voltage control signal;

producing a first error signal based on the modulated signal and the second signal when the first control input is a first value;

producing a second error signal based on the modulated signal and the second signal when the first control input is a second value; and producing the bias point voltage based on the first error signal and second error signal.

11. The method of claim 10 wherein:

the first signal has a zero magnitude when the first control input is a first value and has a non-zero magnitude when the first control input is a second value; and the bias point voltage is based on a difference between the first error signal and the second error signal.

12. The method of claim 11 further comprising setting the bias point voltage to a predetermined value if the difference between the first error signal and the second error signal exceeds a threshold value.

13. The method of claim 10 wherein the second frequency is twice the first frequency.

14. The method of claim 10 further comprising:

producing a third error signal based on a reference voltage and the second signal;

producing a fourth error signal based on the modulated signal when the first control input is a first value and second signal; and computing the difference between the first error signal and the second error signal.

* * * * *